United States Patent [19]

Finet et al.

[11] 4,418,389

[45] Nov. 29, 1983

[54] PRODUCT-TO-FREQUENCY CONVERTER

[75] Inventors: Alain Finet, Newbury; Louis R. Nerone, Cleveland, both of Ohio

[73] Assignee: Stock Equipment Company, Chagrin Falls, Ohio

[21] Appl. No.: 215,817

[22] Filed: Dec. 12, 1980

[51] Int. Cl.³ .............................................. G06F 15/46

[52] U.S. Cl. .................................... 364/478; 328/158; 328/160; 364/469; 364/606

[58] Field of Search ............... 364/468, 469, 478, 567, 364/568, 571, 606, 703, 841; 177/25, 60, 63, 64, 116, 119, 121; 328/133, 156, 158, 160, 155

[56] References Cited

U.S. PATENT DOCUMENTS

| | | | |
|---|---|---|---|
| 3,187,944 | 6/1965 | Stock . | |
| 3,610,908 | 10/1971 | Karosas | 364/832 |
| 3,769,597 | 10/1973 | Mayer | 328/160 |
| 3,868,643 | 2/1975 | Bullivant | 177/119 |
| 3,916,175 | 10/1975 | Lauer et al. | 364/703 |
| 3,960,225 | 6/1976 | Hyer et al. . | |
| 3,976,150 | 8/1976 | Wilson et al. . | |
| 4,023,116 | 5/1977 | Alfke et al. | 328/155 |
| 4,085,375 | 4/1978 | Galuschak et al. | 328/160 |
| 4,199,696 | 4/1980 | Tanaka et al. | 328/160 |
| 4,222,013 | 9/1980 | Bowers et al. | 328/155 |
| 4,243,054 | 1/1981 | Graalmann et al. | 198/505 |
| 4,272,824 | 6/1981 | Lewinger et al. | 364/468 |
| 4,307,346 | 12/1981 | Kurosawa et al. | 328/155 |

*Primary Examiner*—Errol A. Krass

*Attorney, Agent, or Firm*—Pearne, Gordon, Sessions, McCoy, Granger & Tilberry

[57] ABSTRACT

The converter circuit is illustrated as a feed-rate control circuit where a DC weight-per-unit length signal is multiplied by a pulse signal proportional to rate of flow of material. This product is further multiplied by a scaler signal to accommodate material delivery systems of various sizes. This product of three quantities is converted into a feedback frequency which is fed back to increase circuit response and linearity. The circuit is independent of any clock frequency and reference voltage variations by using the frequency and reference voltage in both the main input signal and the negative feedback signal. The foregoing abstract is merely a resume of one general application, is not a complete discussion of all principles of operation or applications, and is not to be construed as a limitation on the scope of the claimed subject matter.

20 Claims, 10 Drawing Figures

PRODUCT-TO-FREQUENCY CONVERTER

BACKGROUND OF THE INVENTION

Control circuits have previously been utilized for controlling the rate of feed of material to a utilization device. As one example, coal on a conveyor belt may be fed at a variable rate by variable speed of the motor driving the conveyor belt and the actual coal per-unit-length of conveyor belt may vary according to the amount of coal dropping out of a bunker or chute onto the conveyor belt. Accordingly, the rate of feed is the multiplication product of the weight-per-unit of belt length times the speed of the conveyor belt.

The weight signal may be generated by a transducer, for example, a load cell, which converts the force or weight of material into an electrical signal. Belt travel may be obtained by an odometer or tachometer that generates a pulse per unit of belt travel or generates a frequency proportional to belt speed. A prior art system for performing this multiplying product is to transmit the load cell signal and odometer signal to a distant electrical cabinet whereat the load cell signal is amplified, converted into a digital signal, and then multiplied by the belt speed signal. This prior art system has at least three disadvantages:

(1) It requires the transmission of the load cell output signal, which is a low level signal of generally a few millivolts, over a long conductor. For this reason, the load cell wiring requires special precautions to eliminate the noise induced by electromagnetic radiation. Also, errors are introduced by the thermocouple effect between wire connections.

(2) The electronics require considerable programming to scale the system to the required demand and to provide the correct feedback signal. Usually the prior art systems reverted to a scaling of both the weighing signal and the belt speed signal into a combined percentage signal in order to accommodate system variations.

(3) The circuit requires the use of an analog-to-digital converter to digitize the weighing signal. These converters are expensive and introduce errors for which compensation is extremely difficult.

SUMMARY OF THE INVENTION

The problem to be solved, therefore, is how to achieve a product-to-frequency converter which is more accurate, which may be utilized at remote locations, which is compensated for variables, and which may be used in utilization devices of a wide range of maximum feed rates.

The problem may be solved by a product-to-frequency converter comprising first signal-generating means providing a continuous DC signal with a varying amplitude constituting a multiplicand value; second signal-generating means providing a first periodic pulse signal whose frequency constitutes a multiplier value, the pulses constituting said first periodic pulse signal each being of predetermined duration; summing means providing, in response to said DC signal and said first periodic pulse signal, a product value constituted by a second periodic pulse signal having a frequency equivalent to said first periodic pulse signal, a peak amplitude equivalent to said DC signal, and a pulse duration equivalent to said predetermined duration; and a voltage-controlled oscillator means having an input responsive to said second periodic pulse signal, and an output providing a third periodic pulse signal of a frequency proportional to said product value, said third periodic pulse signal remaining constant when said DC amplitude varies in inverse proportion to a change in the frequency of said second periodic pulse signal.

The problem may further be solved by a feed rate control circuit comprising, in combination, a first multiplier having an output and having first, second, and third inputs, means supplying a material weight signal to said first input of said first multiplier, means supplying a material delivery speed signal to said second input of said first multiplier, means supplying a scaler signal to said third input of said first multiplier, and amplifier connected to amplify the output of said first multiplier, and a volts-to-frequency converter connected to the output of said amplifier to supply an output frequency signal with the frequency dependent upon said amplifier voltage output and with said output frequency signal being a scaled feed rate signal of material weight times material delivery speed.

The problem may further be solved by a feed rate control circuit comprising, in combination, first and second multipliers each having an output and each having first and second inputs, means supplying a material weight signal to said first input of said first multiplier, means supplying a material delivery speed signal to said second input of said first multiplier, an amplifier connected to amplify the difference between the outputs of said first and second multipliers, a volts-to-frequency converter connected to the output of said amplifier to supply an output frequency signal with the frequency dependent upon said amplifier voltage output, and feedback means connecting said output frequency signal to an input of said second multiplier to reduce the voltage applied to said amplifier.

Accordingly, an object of the invention is to provide a product-to-frequency converter which obtains a product of speed times the unit weight of the material and scales this to maximum capacity of a particular system.

Another object of the invention is to provide a control circuit which multiplies the product of three different inputs, speed, unit weight, and a scaling factor.

Another object of the invention is to provide a control circuit which multiplies together three input signals and then provides a feedback to compensate for possible errors in two of those input signals, components, and circuits.

Another object of the invention is to provide a feed rate control circuit which has at least a 100:1 range with the same accuracy at the lower scale as at full scale.

Another object of the invention is to provide a feed-rate control circuit wherein the scaling for different capacities of systems may be accomplished with a scaling of a single input signal.

Another object of the invention is to provide a control circuit which is independent of both reference voltage and clock frequency variation.

Other objects and a fuller understanding of the invention may be had by referring to the following description and claims, taken in conjunction with the accompanying drawing.

BRIEF DESCRIPTION OF THE DRAWINGS

FIGS. 3A–H, is a graph of signals versus time to illustrate the operation of the circuit of FIGS. 1 and 2.

DESCRIPTION OF THE PREFERRED EMBODIMENTS

Figure 1:
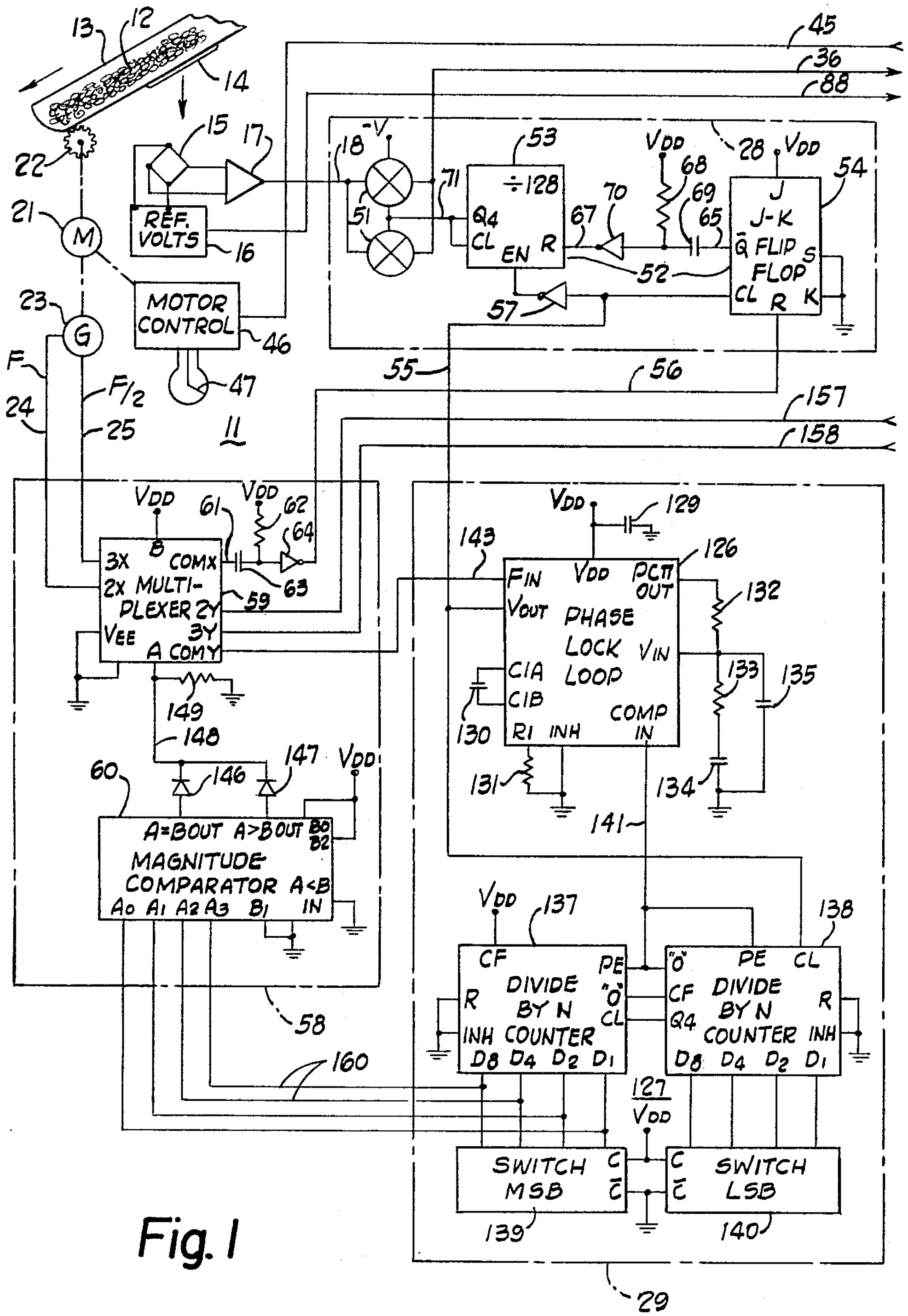
FIGS. 1 and 2, placed from left to right, respectively, together represent the schematic diagram of the circuit embodying the invention.
Figure 2:
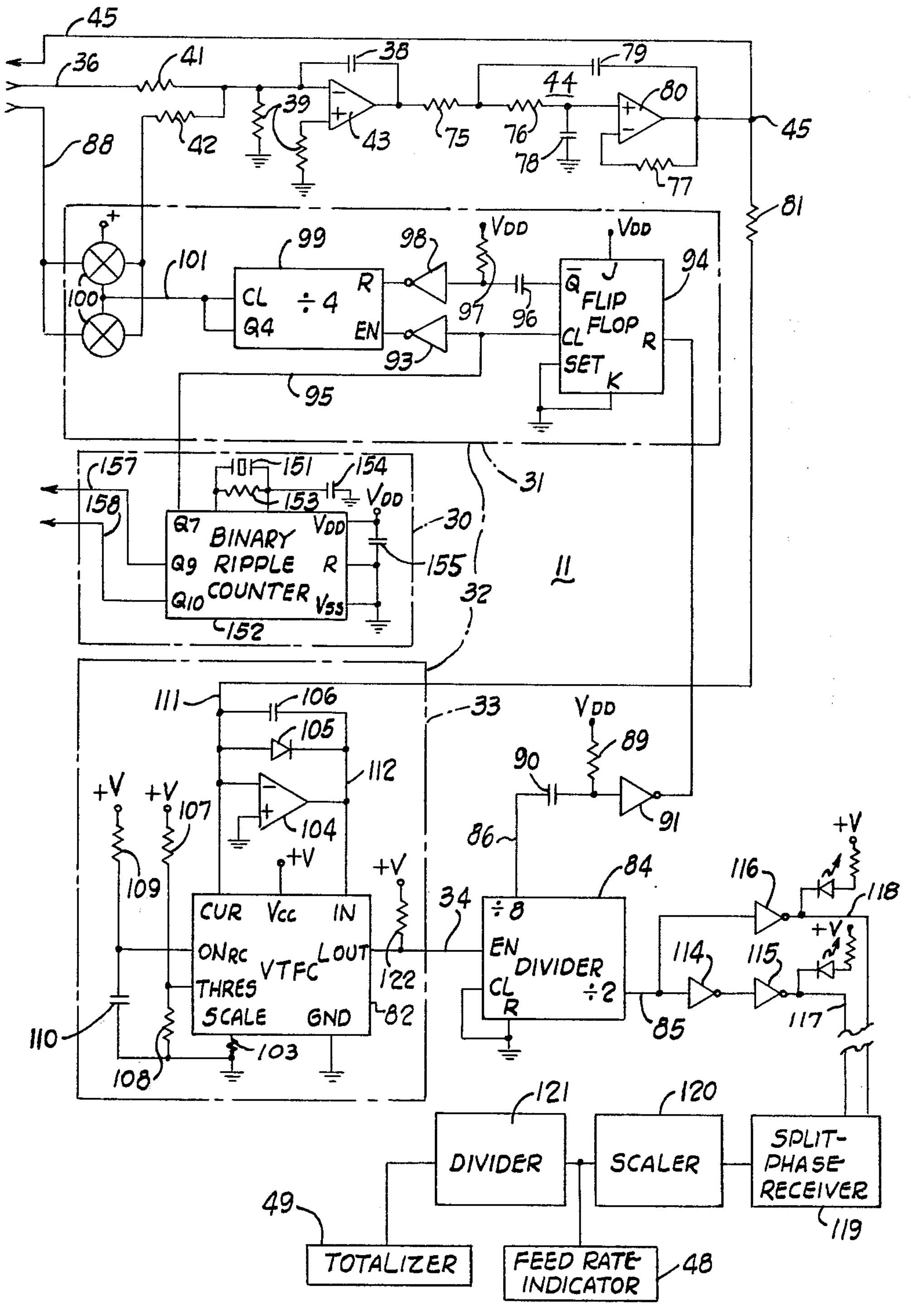

FIGS. 1 and 2, positioned side by side, show schematically a circuit 11 which is a multiplier circuit with a product-to-frequency converter. This multiplier circuit may be used in a number of different ways, and is illustrated as a feed rate circuit as one example of utility. Material, such as coal 12, may be delivered by some means such as a conveyor 13 to a utilization device (not shown) such as a steam boiler. The amount of material on the conveyor may vary per-unit-length, due to irregularities of density or feeding the material onto the conveyor, so the weight of the material per-unit-length of the conveyor is a weight signal. A multiplication of the weight per unit of conveyor belt length times the speed of the conveyor belt will equal the feed rate in weight or mass per unit of time. To illustrate a way of obtaining the weight signal and the speed signal, the circuit 11 illustrates a weight span 14 over which the conveyor passes, and this acts on a load transducer, such as a Wheatstone bridge load cell 15 which is supplied by a reference voltage source 16 and the output supplied to a precision or instrument amplifier 17 to obtain a weight signal on conductor 18. In this embodiment, this is an analog signal, which is a variable DC signal of a few volts.

A motor 21 is connected to a drive wheel 22 to drive the conveyor to feed the material 12 to the utilization device. This feed signal may be taken from the drive wheel 22 or, as shown, from a tachometer or generator 23 connected to the drive shaft. In this preferred embodiment, the tachometer 23 is a pulse generator, generating one pulse for each increment of conveyor belt travel. The particular pulse generator shown has two outputs, so that either a given speed frequency F may be obtained on a conductor 24, or a half-speed signal F/2 may be obtained on a conductor 25. The circuit 11 of FIGS. 1 and 2 accomplishes the multiplication of the weight signal on conductor 18 by the speed signal on conductor 24 or 25. This is accomplished principally in a first multiplier 28. More importantly, the circuit accomplishes a scaled product of unit weight times feed speed by also multiplying by a scaling factor from a scaler 29.

FIG. 2 shows another portion of the circuit 11, and it includes a clock 30 which establishes a reference frequency or multiples thereof for operation of circuit 11. The scaler 29 scales a frequency from this clock 30 so that this scaled clock frequency is multiplied times the weight signal, which is multiplied by the speed signal in the first multiplier 28. The FIG. 2 portion of circuit 11 also shows a second multiplier 31 which is used in a feedback circuit 32. Another part of the feedback circuit 32 is a voltage controlled oscillator circuit 33 having an output 34.

The first multiplier 28 has an output on a conductor 36 on which appears an average input voltage to a first input resistor 41. A second input resistor 42 from the feedback circuit 32 is connected as a negative feedback, together with the first input resistor 41, to an error amplifier 43. A signal conditioning circuit 44 conditions this output so that a motor control signal appears on the output 45 of this conditioning circuit 44. This motor control signal is supplied back to a motor control circuit 46, which is connected to control the speed of the motor 21 and which may have a manual speed control 47. Once the conveyor speed is set by the speed control 47, then the circuit 11 establishes the preset feed rate. If the material is coal being delivered to a steam boiler, and if the coal becomes partially blocked in the bunker from which it drops onto the conveyor 13, since the amount of coal per-unit-length of conveyor becomes materially smaller, then the circuit 11 controls the conveyor speed such that the motor 21 increases the speed of the conveyor 13 so as to maintain constant the rate of feed of the coal material to the boiler.

The same circuit 11 may be provided with many different sizes of steam boilers or other utilization devices, so the scaler 29 scales the output of the first multiplier 28 in accordance with the total capacity of the utilization device. If this device is a steam boiler, then, for example, the maximum capacity of the system might be 100 tons of coal per hour being delivered. However, the utilization device might easily be of smaller capacity, for example 20 tons, 40 tons, or 60 tons per hour maximum, in which case the scaler 29 would be set at 20, 40, or 60, respectively.

The circuit 11 multiplies together two signals. In the preferred embodiment, this circuit multiplies a variable DC or analog voltage, shown as the weight signal on conductor 18, by a frequency, shown as the conveyor speed signal on conductor 24 or 25. The first multiplier 28 multiplies together these two voltages to generate an output signal on conductor 36 which is proportional to the product of these two signals. Additionally, the circuit 11 produces first and second control signals. The first control signal appears on the output conductor 45 and is used to operate the motor 21 via the motor control 46, and the second control signal is an output frequency on conductor 34 proportional to the product of the multiplied voltage and frequency. From this second control signal, a feed rate indicator 48 may be supplied to indicate the rate of material 12 being delivered, and also a totalizer 49 may be supplied which indicates the total quantity of material delivered. In the preferred embodiment, the second control signal on conductor 34 is affected directly by the scaler 29, to represent the percentage of the capacity of the system with which the circuit 11 is used relative to the maximum capacity of circuit 11. For example, a 4–20 milliamp output at conductor 45 might indicate 0 delivery rate of the conveyor at 4 milliamps, and maximum delivery rate at 20 milliamps. However, in two different material delivery systems, the 20 milliamp maximum signal may establish a feed rate of 20 tons per hour or 60 tons per hour, depending upon the scaling by the scaler 29, described in detail below.

In more detail, the circuit 11 includes a pair of analog switches 51, and in the preferred embodiment these are paired for current carrying capacity and to lower the onstate resistance. An analog or variable DC voltage is applied on the conductor 18 to the analog switches 51. The on or conduction time of these switches 51 is controlled by an input precision pulse generator 52. This input pulse generator includes a divider or counter 53 and a flip-flop 54. The counter 53 counts a certain number of pulses, e.g., 128 pulses, from an input reference frequency on a conductor 55. Originally, this reference frequency comes from the clock 30, but is a scaled frequency as scaled by the scaler 29. The flip-flop 54 and hysteresis gate 57 are used as a synchronizing circuit to synchronize the start of a pulse on speed frequency conductor 56, with a pulse on the reference conductor 55. The incoming frequency, which is the conveyor speed signal, is controlled by a range selector 58 which minimizes propagation delay errors in the circuit. This range selector includes a multiplexer 59 and a magnitude comparator 60. The function of this range selector 58 will be described later, and for simplicity, let it be assumed that a square wave proportional to the speed signal in frequency exists at the output 61 of the multiplexer 59. This may be illustrated by curve 61A in FIG. 3A. The falling edge of the square wave is converted into a pulse by resistor 62, capacitor 63, and hysteresis gate 64. This is a narrowing of the pulse for sharp rise and fall times of the pulse. This is illustrated by pulse 56A in FIG. 3B. This pulse 56A resets the flip-flop 54, and, on the next rising edge 55A (see FIG. 3C) of the input reference frequency on conductor 55, it toggles the flip-flop 54. The action of the $\overline{Q}$ output 65 of flip-flop 54 is shown by the pulse output 65A in FIG. 3D. This action generates a narrow pulse 67A (see FIG. 3E) on the reset input 67 of the divider 53. This pulse 67A is a narrow pulse generated by the action of a resistor 68, capacitor 69, and a hysteresis gate 70. The pulse 67A resets the divider 53, causing its output 71 to go low, which turns on the input analog switches 51 and applying the magnitude of the input voltage or weight signal to the first input resistor 41. The output 71 of the divider 53 remains a logic low (see curve 71A in FIG. 3F) until 128 pulses from the input reference frequency on conductor 55 are counted. At this time, the output 71 goes to a logic 1, turning off the input analog switches 51 and the divider 53 stops counting. Thus, for an input speed signal pulse 56A on conductor 56, the analog switches 51 remain conducting for 128 pulses from the input reference frequency on conductor 55. This produces a pulse 41A (FIG. 3G) on the first input resistor 41 which is equal to the width of the pulse 71A. The action of generating a pulse 71A of fixed width for every input frequency pulse of the speed frequency on conductor 56 generates an average voltage on the first input resistor 41 whose average value is directly proportional to the input speed frequency times the amplitude of the input analog voltage or weight signal on conductor 18. Therefore, the average voltage applied on the first input resistor 41 is the product of both the input analog signal 18 and a speed frequency signal on conductor 56. Still further, the average voltage applied at this first input resistor 41 is a product of three things: the weight signal on conductor 18, the speed frequency signal on conductors 24 or 25, and a scaled clock signal.

FIG. 2 shows that the first input resistor 41 is an input to the error amplifier 43. The error amplifier 43 has the feedback capacitor 38 to make it act as an integrator, and has high impedance resistors 39 on the input which provide a path to ground for the op amp bias current when both input resistors 41 and 42 momentarily provide no input. The error amplifier 43 has no resistive feedback, so that it acts not only as an integrator but also with practically complete open loop gain of, for example, 50,000 or 100,000. This amplifier amplifies the difference between the average input voltage applied at the first input resistor 41 and the average feedback voltage applied at the second input resistor 42. These resistors are precision resistors in order to minimize any errors in the circuit. The feedback voltage applied at the second input resistor 42 is generated by a circuit similar to the one used to generate the input voltage for the first input resistor 41. The output of the error amplifier 43 is connected to a two-pole, non-inverted, low pass filter made up of resistors 75,76, and 77, capacitors 78 and 79, and op amp 80. This low pass filter, which has a roll-off point of approximately 20 hertz in one circuit constructed according to the invention, is used to eliminate the ripple which is present at the output of the error amplifier 43. The output of the two-pole filter 44 is connected through a resistor 81 to the voltage-controlled oscillator circuit 33 which has a conversion ratio of approximately 2000 hertz per volt. The voltage-to-frequency conversion is performed by a volt-to-frequency converter 82. The entire circuit 11 is scaled such that, when the average input voltage on input resistor 41 is at a maximum, the output 34 of the VTFC circuir 82 is 20 kilohertz frequency, as an example of a practical circuit 11. This is fed to a divider 84, which has two outputs 85 and 86. These outputs divide down the output frequency, with the output 85 going to supply the indicator 48 and the totalizer 49. The output 86 is divided still further, for example divided by 8, to eliminate errors created by the variation in propagation delays. This output frequency is used in conjunction with a negative voltage reference on a reference conductor 88 to generate the average feedback voltage on the second input resistor 42.

The feedback frequency at the VTFC output 34 and divider output 86 is converted into a pulse by the network of resistor 89, capacitor 90, and hysteresis gate 91. This is a narrow pulse with sharp rise and fall times. This feedback pulse resets a flip-flop 94, similar to flip-flop 54, and, with hysteresis gate 93, is used to synchronize the frequency of the clock 30 and the feedback pulse. After the flip-flop 94 has been reset, then the next pulse from the feedback reference frequency on conductor 95 clocks the flip-flop 94 and a pulse is generated by the network of resistor 96, capacitor 97, and hysteresis gate 98. This pulse resets a counter or a divider 99, similar to the divider 53. In one practical circuit made in accordance with this invention, this divider did not divide by 128; rather, it divided by 4. As soon as the divider 99 is reset by the pulse from the hysteresis gate 98, this immediately turns on a pair of feedback analog switches 100 via a conductor 101. This action connects an input from the reference voltage conductor 88 through the analog switches 100 to the second input resistor 42. In a practical circuit made in accordance with this invention, this reference voltage was −10 volts. The divider or counter 99 counts the predetermined number of pulses (from conductor 95), four in this case, and then turns off the analog switches 100. Therefore, whenever the system is operating at its programmed maximum capacity, the average voltage applied at the second input resistor 42 is always the same.

In order to scale the circuit 11 correctly when a lower maximum input frequency on conductor 56 is desired to generate the maximum feed rate frequency on divider output 85, the pulse width out of the input pulse generator 52 must be increased in order to apply the same average voltage at the first input resistor 41, keeping the circuit 11 on the same scaling. The scaling of the average input voltage is achieved by the scaler 29, and will be described below.

The feedback circuit 32 includes the voltage-controlled oscillator 33. This circuit includes the volt-to-frequency converter 82, which has an op amp 104 connected to conduct current from the current output 111 of the VTFC 82 to the input terminal. Also, a diode 105 is connected to limit the negative voltage across the input and output 112 of the op amp 104. A feedback capacitor 106 is connected from the output to the input of the op amp 104. The threshold input of the VTFC 82 is connected to the junction of resistors 107 and 108, which are connected between positive operational voltage and ground. The ON RC input of the VTFC 82 is connected to the junction between a resistor 109 and a capacitor 110, which are connected between positive operational voltage and ground.

This voltage-controlled oscillator circuit 33 acts as follows. The positive voltage applied by conductor 112 to the input pin of the VTFC 82 is compared to the voltage at the threshold input as set by the value of resistors 107 and 108. If the input voltage is higher, the input comparator fires a one-shot multivibrator, whose output is connected to both the logic output at conductor 34 and a precision switched current source internal of the VTFC 82. The logic output at conductor 34 goes low, and the internal current source produces a current pulse at the current output conductor 111. The time on for the one-shot is determined by the resistor-capacitor network 109, 110 connected to the ON-RC terminal. The op amp 104 acts as an error amplifier whose output is proportional to the error between the current generated by the output voltage of the two-pole filter 44 divided by the output resistor 81 and the current pulse generated at conductor 111 of the VTFC 82. The use of the capacitor 106 makes the error amplifier 104 an integrator, and this improves the linearity of the voltage-controlled oscillator circuit 33 because it keeps the output of the current source at conductor 111 at a constant voltage of practically zero. Actually, this voltage might be 1 millivolt, which, multiplied by the high gain of the amplifier 104, produces just enough voltage on conductor 112 to maintain the circuit in balance. This eliminates the linearity error due to the current source output conductance.

The logic output of the VTFC 82, which is on conductor 34, is connected by a resistor 122 to positive operating voltage, and, is 20 kilohertz in one practical circuit made in accordance with the invention, whenever the circuit is operating at its maximum feed rate. This 20 kilohertz frequency is divided by 2 and applied to the output conductor 85 in order to generate a symmetrical 10 kilohertz signal, which is the output of the circuit 11. The 10 kilohertz signal on conductor 85 is transmitted by the hysteresis gate 114 and line driver 115 to one transmission line 117, and, by a line driver 116, to another transmission line 118. The devices 115 and 116 are line driver buffers to drive these transmission lines so that the output frequency, at a maximum of 10 kilohertz frequency, may be transmitted over long distances, for example, some remote location whereat the totalizer 49 and indicator 48 are mounted. The two transmission lines transmit two square wave signals 180 degrees out of phase and they are received at a split phase receiver 119, which passes the signal to a scaler 120, which may be a binary rate multiplier and which may be essentially the same as the scaler 29, and from there to a divider 121. The output of the scaler 120, which multiplies the incoming frequency by N/100, supplies the feed rate indicator 48 and the output of the divider 121 supplies the totalizer 49, N being the number on scaler 29.

The scaler 29 establishes the scaling of the average input voltage to the first input resistor 41. The reason is that it is desired that the output frequency at the conductor 34 be 20 kilohertz whenever the circuit 11 is operating at its maximum feed rate. This scaling is accomplished by changing the pulse width out of the input precision pulse generator 52 to accommodate changes in the desired maximum input frequency on conductor 56. The scaler 29 accomplishes this function and it includes a phase lock loop circuit 126 and a divider 127. A capacitor 129 is connected between the $V_{DD}$ and $V_{SS}$ inputs of the phase lock loop 126 for noise suppression and a capacitor 130 is connected across the capacitor terminals of this phase lock loop. A resistor 131 is connected between the resistor terminal and ground of this phase lock loop. Resistors 132 and 133, together with capacitors 134 and 135, provide compensation and filter the output of the phase comparator and are connected to $V_{IN}$, which is the input to the voltage-controlled oscillator of the phase lock loop 126.

The divider 127 may be one of several types, but in this case includes two dividers 137 and 138 and two switches 139 and 140. The dividers 137 and 138 may be decimal divide-by-N counters and the switches 139 and 140 may be manually operable switches, such as thumb wheel switches. By using two of these dividers and two switches, two different decimal numerals may be selected as the letter N so that this divider divides by any integer from zero to 99. The switch 140 sets the least significant bit and the switch 139 sets the most significant bit.

In a circuit made in accordance with the invention, the circuit 11 was designed to supply maximum of 20 kilohertz feed rate frequency on conductor 34, and one system for which the circuit 11 was designed was intended to supply 100 tons per hour of coal via the conveyor 13 to a utilization device such as a steam boiler. The circuit 11 may also be used with systems of smaller capacity, for example, 20, 40, or 60 tons per hour. In such case, the scaler 29 permits the ready scaling of the circuit 11 to this lower capacity system. In such case, the thumb wheel switches 139 and 140 would be set at 20, 40, or 60, respectively. This scales the circuit 11 at 20%, 40%, or 60% of the maximum capacity. For a 20-ton per hour system, for example, one could then still have 20 kilohertz maximum feed rate frequency at the conductor 34 whenever the conveyor 13 was delivering coal to the steam boiler at the maximum feed rate for that size system.

The scaler 29 utilizes the divider 127 to divide by a number N, and this is supplied on a conductor 141 to the comparator-in terminal of the phase lock loop 126. The clocked frequency or a multiple thereof is applied on a conductor 143 to the frequency-in terminal of the phase lock loop 126. The voltage-out terminal of the phase lock loop is connected to the input reference frequency conductor 55 to supply it with a scaled or multiplied frequency. The phase lock loop 126 will normally track an input frequency applied at the frequency-in terminal at conductor 143. However, with the divide-by-N counter connected between the comparison-in terminal and the voltage-out terminal, the phase lock loop 126 will operate at N times the input frequency applied to conductor 141. Thus, the effect is that with the divider set at some integer N, then the phase lock loop runs with an output at N times the incoming frequency on conductor 143.

An alternative position for the scaler 29 is to position it between the generator 23 and the conductor 61, where it will scale the incoming frequency rather than the pulse width.

The range selector 58 is provided to minimize circuit errors. The phase lock loop 126 will operate over a wide frequency range, for example, 1000:1. However, the range selector 58 narrows the capture range of this phase lock loop to about 50:1, so that it is stable and easier to compensate. Further, the range selector 58 maintains the pulse width out of the input precision pulse generator 52 as wide as possible in order to minimize propagation delay errors. The range selector 58 includes the multiplexer 59 and the magnitude comparator 60. Diodes 146 and 147, together with resistor 149, form a discreet AND gate to conduct the output from the A=B out terminal and A>B out terminal by a conductor 148 to the A terminal of the multiplexer 59, which is a one-of-four switch.

The clock 30 is controlled by a crystal 151 which is connected to the crystal terminals of a divider or counter 152. In this particular instance, the divider 152 is a binary ripple counter which has 14 stages for maximum division of $2^{14}=16{,}384$. A resistor 153 is connected across the crystal 151 and a capacitor 154 is connected from one side of the crystal to ground. A capacitor 155 is connected between the $V_{DD}$ terminals and $V_{SS}$ terminals for noise suppression. The operating frequency of the clock is not critical, and in a circuit made in accordance with the invention the crystal 151 operated at 4 megahertz. At such frequency of oscillation, Q7 output on conductor 95 was 31.25 kilohertz, the Q9 output on a clock conductor 157 was 7.8125 kilohertz, and the Q10 output on a clock conductor 158 was 3.90625 kilohertz.

The range selector 58 selects either the clock frequency of 7.8 kilohertz or 3.9 kilohertz, and also selects the incoming speed frequency of F on conductor 24 of F/2 on conductor 25. Since the scaler 29 has a 1 to 99 range of scaling, the numeral 50 is preset on the magnitude comparator 60 by making the $B_0$ and $B_2$ terminals high and the $B_1$ and $B_3$ terminals grounded. This numeral 50, or numeral 5 of the most significant bit, is passed by the conductors 160 from the magnitude comparator to the most significant bit switch 139. Accordingly, if the scaler 29 is set at less than 50, then the magnitude comparator 60 selects the higher clock frequency of 7.8 kilohertz, and selects the higher speed frequency of F on conductor 24. If, on the other hand, the scaler 29 is set at 50 or greater, then the opposite is true, with the magnitude comparator 60 selecting the lower clock frequency of 3.9 kilohertz and the lower speed frequency of F/2 on conductor 25. Therefore, the larger the number programmed on the digit switches 139 and 140, the higher the output frequency of the phase lock loop 126. By this means, the relationship between the input second frequency and the input reference frequency on conductor 55 remains the same regardless of the position of the switches 139 and 140. The purpose of this circuit feature is to keep the pulse width out of the input precision pulse generator 52 as wide as possible to minimize errors introduced by variations in propagation delay.

The feed rate indicator 48 and totalizer 49 may be at a remote location. The scaler 120, which may be a binary rate multiplier, is set at the same multiplier as the scaler 29. If the scaler 29 is set at the numeral 20, for example, then the scaler 120 would also be set at the numeral 20, and if the frequency, for example, at the output conductor 85 is 10 kilohertz, then this will indicate 20 tons per hour delivered by conveyor 13, in the example set forth above. If the output frequency at conductor 85 is only 9 kilohertz, the feed rate indicator will indicate 18 tons per hour being delivered.

The divider 121 further scales down the output signal based upon a fixed conversion factor to obtain a signal which represents pounds of material 12 being delivered.

In a circuit constructed in accordance with this invention, the circuit components and values thereof were as follows:

| Integrated Circuits | | |
|---|---|---|
| 17 | instrument amplifier, automatic zero reset once per second | |
| 43 | amplifier | LM 208 |
| 51, 100 | analog switch | HI 201-5 |
| 53, 99 | Multiplexer | 4520 |
| 54, 94 | Flip-Flop | 4027 |
| 59 | Multiplexer | 4052 |
| 60 | Magnitude Comparator | 4585 |
| 64, 70 | Hysteresis Gate | 40106 |
| 80, 104 | Op amp | LM 201 |
| 82 | VTFC | RM 4151 |
| 84 | Divider | 4520 |
| 91, 98 | Hysteresis Gate | 40106 |
| 114 | Hysteresis Gate | 40106 |
| 115, 116 | Line driver buffer | 9668 |
| 126 | Phase Lock Loop | 4046 |
| 137, 138 | Divider | 4522 |
| 152 | Binary Ripple Counter | 4060 |
| 57, 93 | Hysteresis Gate | 40106 |

| Resistors + 5% normally | | | Capacitors in microfarads, except as noted | |
|---|---|---|---|---|
| 39 | 1 Megohm | | 38 | 1. 50 v. |
| 41, 42 | 20K | .01% 5 PPM/degree C. | 63 | 100 pf |
| 62 | 6.8K | | 69 | 100 pf |
| 68 | 5.6K | | 78 | .047 |
| 75 | 100K | | 79 | .1 |
| 76 | 100K | | 90 | 100 pf |
| 77 | 200K | | 96 | 100 pf |
| 89 | 10K | | 106 | .0047 |
| 97 | 5.6K | | 110 | .001 |
| 103 | 11.3K | | 129 | .1 |
| 107 | 4.99K | | 130 | 100 pf |
| 108 | 10K | | 134 | .047 |
| 109 | 27.4K | | 135 | .1 |
| 113 | 100K | | 154 | 33 pf |
| 122 | 10K | | 155 | .1 |
| 131 | 10K | | | |
| 132 | 10K | | | |
| 133 | 4.7K | | | |
| 149 | 47K | | | |
| 153 | 22 Megohms | | | |

Figure 3:
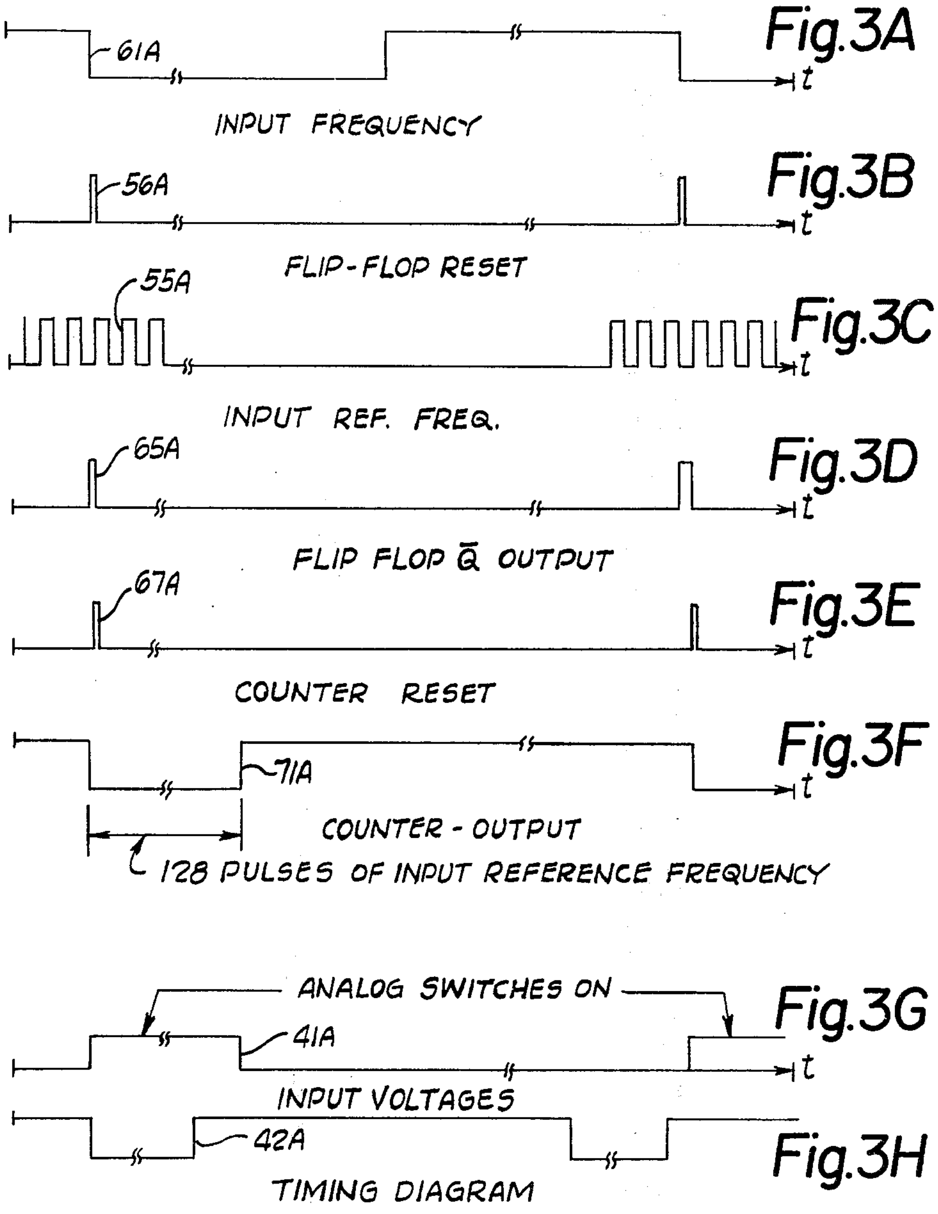
FIG. 3, comprising

Referring again to FIG. 3, the square wave 42A shown at FIG. 3H is the voltage pulse obtained across the second input resistor 42. This voltage pulse is negative, whereas, the pulse 41A is positive, so that these two signals are combined and only the difference, or error, between the two is that which is amplified by the error amplifier 43. This error might be only about 1 millivolt, and when multiplied by the high gain amplifier 43, provides a maximum output of, for example, 10 volts supplied to resistor 75. When filtered and supplied as a DC signal, this is about 10 volts DC at the conductor 45. This is returned to the motor control circuit 46 to control the conveyor motor 21 to maintain the stable speed unless the amount of coal per unit of length on the conveyor 13 should change, in which case, the motor speed will change inversely to maintain a constant feed rate.

Referring to FIG. 3G, the height of the pulse 41A is proportional to the weight of material on the conveyor 13. The frequency of the pulses 41A is directly proportional to the conveyor speed rate on conductors 24 or 25, so the period of the frequency between pulses 41A is inversely proportional to the speed rate. The width of each pulse 41A is the scaled clock signal proportional to the numeral set on the scaler switches 139 and 140. Thus, this signal available on the first input resistor 41 is a product of three quantities. At the same time, the second input resistor 42 has a signal which is a feedback signal almost completely canceling the voltage across the first input resistor, except for the small error, for example 0.1 millivolt. This feedback signal, represented by pulse 42A in FIG. 3H, is one wherein the height of the pulse 42 is dependent on the reference voltage from the reference voltage source 16. The period between pulses is inversely proportional to the feedback frequency, and the width of each pulse 42A is proportional to the clock frequency. Accordingly, the feedback arrangement is such that the variations, if there are any due to temperature changes or the like in the reference voltage and in the clock frequency, are balanced out because the input voltage at 18 is proportional to the reference voltage. The clock frequency and the reference voltage appear in the same manner in both the pulses 41A and 42A, so that it is only the ratio of the reference voltage which appears on the input resistor 41 versus that on the input resistor 42. Also it is only the ratio of the clock frequency which appears on the input resistor 41 versus that on the input resistor 42. The motor speed signal at the conductor 45 is therefore a very accurate signal proportional to the weight signal on conductor 18 times the speed rate signal on conductor 24 or 25. The transfer function for the circuit is $$f_{out} = \frac{F \times 512 \times V_{IN} \times R_{42}}{N \times V_{ref} \times R_{41}}.$$

The circuit 11 provides a product-to-frequency converter which has a continuous DC signal on the conductor 18 of varying amplitude which constitutes a multiplicand value. Also, this circuit 11 provides the tachometer generator 23 which generates a first periodic pulse signal on conductors 24 or 25 whose frequency constitutes a multiplier value. In one typical circuit, for example, this might be a maximum of 2 kilohertz at maximum speed of the conveyor 13. The pulses of this first periodic pulse signal are controlled by the signal from the clock 30 or a scaled clock signal from the scaler 29, so that at the output of the divider 53, these pulses are each of a predetermined duration. The analog switches 51 and the first input resistor 41 may be considered summing means which act in response to the DC signal on conductor 18 and the first periodic pulse signal on conductor 71 to establish a product value constituted by a second periodic pulse signal across resistor 41, which has a frequency equivalent to the first periodic pulse signal, a peak amplitude equivalent to the DC signal on conductor 18, and a pulse duration equivalent to the predetermined duration established by divider 53 and scaler 29. The circuit 11 also includes the voltage-controlled oscillators means 33, which has an input from the input resistor 41 via the error amplifier 43 and filter 44, and is responsive to this second periodic pulse signal. The voltage-controlled oscillator 33 also has an output providing a third periodic pulse signal on conductor 86 at a frequency proportional to said product value. Of importance is the fact that the third periodic pulse signal remains constant when the DC amplitude on conductor 18 varies in inverse proportion to a change in the frequency of the second periodic pulse signal on conductor 71. Still further, the circuit 11 includes the scaler 29 which scales the predetermined duration of the pulse appearing on conductor 71. Also, this circuit 11 includes the clock 30, which is determinative of the pulse duration provided by this scaler 29. The error amplifier 43 and filter 44 establish that the voltage-controlled oscillator 33 has an input responsive to the average DC value of this second periodic pulse signal.

Another important feature of the circuit 11 is that it includes a feedback circuit from the output of the voltage-controlled oscillator 33 to the input of the voltage-controlled oscillator via the second input resistor 42, error amplifier 43, and filter 44. This feedback circuit is responsive to any changes in the clock frequency and any changes in the value of the reference source 16 to maintain the third frequency signal at a constant value upon changes in the DC amplitude on conductor 18 in inverse proportion to a change in the frequency of the second periodic pulse signal on conductor 24 or 25.

It will also be noted that the circuit 11 is a feed-rate control circuit which controls one of the quantity of coal delivered to the conveyor 13 or the speed of the conveyor 13 to maintain the predetermined rate of feed of the coal or other material 12 to a utilization device. In the circuit as illustrated, this control is of the rate of speed of the conveyor 13. The material weight signal on conductor 18 is a combination of the output from the material weighing transducer 15 and the reference voltage source 16. The feedback circuit 32 includes a means to compensate for any variations in the reference voltage by having this same reference voltage supplied on conductor 88 to the analog switches 100 to determine the height of the pulse 42A in FIG. 3H. Also, it will be noted in the circuit 11 that the scaler signal on the conductor 71 is a product on the multiplying factor set by the switches 139 and 140 times the signal from the clock 30. The feedback circuit 32 further includes a means to compensate for any variations in the clock signal by having this same clock signal fed back on the conductor 95, and thus affect the output duration of the pulse from divider 99 on the conductor 101 which is applied to the feedback analog switches 100.

The circuit 11, as constructed in the preferred embodiment, provides a feed-rate control circuit which has a 100:1 range in the maximum feed rate of the material flow system being controlled, yet with the same high accuracy at the lower scale as at full scale.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A product-to-frequency converter comprising:

first signal-generating means providing a continuous DC signal with a varying amplitude constituting a multiplicand value;

second signal-generating means providing a first periodic pulse signal whose frequency constitutes a multiplier value, the pulses constituting said first periodic pulse signal each being of predetermined duration;

multiplying means providing, in response to said DC signal and said first periodic pulse signal, a product value constituted by a second periodic pulse signal having a frequency equivalent to said first periodic pulse signal, a peak amplitude equivalent to said DC signal, and a pulse duration equivalent to said predetermined duration;

a voltage-controlled oscillator means having an input, and an output; and means responsive to said second periodic pulse signal for providing a signal to the input of said voltage-controlled oscillator means, said output providing a third periodic pulse signal of a frequency proportional to said product value, said third periodic pulse signal remaining constant when said DC amplitude varies in inverse proportion to a change in the frequency of said second periodic pulse signal.

2. A product-to-frequency converter according to claim 1, including scaling means for varying said predetermined duration.

3. A product-to-frequency converter according to claim 2, including clock means determinative of the pulse duration provided by said scaling means.

4. A product-to-frequency converter according to claim 3, including feedback means connected from the output of said voltage-controlled oscillator to the input of said voltage-controlled oscillator to maintain said third frequency signal at a constant value when said DC amplitude varies in inverse proportion to a change in the frequency of said second periodic pulse signal.

5. A product-to-frequency converter according to claim 4, including a reference source providing a reference value, one of said multiplicand and multiplier varying directly in accordance with said references value, and said feedback means including a feedback of said reference value.

6. A product-to-frequency converter according to claim 4, including clock means determinative of said predetermined pulse duration, and said feedback means including a feedback of a signal from said clock means.

7. A product-to-frequency converter according to claim 1, wherein said oscillator means has an input responsive to the average DC value of said second periodic pulse signal.

8. A product-to-frequency converter according to claim 1, including scaling means for varying either said predetermined duration or said peak amplitude.

9. A feed rate control circuit comprising, in combination, a first multiplier having an output and having first, second, and third inputs;

means supplying a material weight signal to said first input of said first multiplier;

means supplying a material delivery speed signal to said second input of said first multiplier;

means supplying a scaler signal to said third input of said first multiplier;

an amplifier connected to amplify the output of said first multiplier and to have an output adapted to control the rate of material feed; and a volts-to-frequency converter connected to the output of said amplifier to supply an output frequency signal with the frequency dependent upon said amplifier voltage output and with said output frequency signal being a scaled feed rate signal of material weight times material delivery speed.

10. A control circuit as set forth in claim 9, wherein one material signal is a direct current signal and the other material signal is an alternating current signal.

11. A control circuit as set forth in claim 9, wherein one signal is a direct current signal and the other two signals are alternating current signals.

12. A control circuit as set forth in claim 11, wherein said amplifier is connected to produce a pulse train of variable height, width, and period.

13. A control circuit as set forth in claim 9, wherein with a constant feed rate said converter has an output to vary the frequency of said delivery speed signal inversely proportional to variations in said weight signal.

14. A control circuit as set forth in claim 9, wherein said weight signal is proportional to a combination of a material weighing transducer output and a reference voltage, and means to compensate for any variations in said reference voltage.

15. A control circuit as set forth in claim 9, wherein said scaler signal is proportional to a combination of a clock signal and a multiplying factor, and means to compensate for any variations in said clock signal.

16. A feed rate control circuit comprising, in combination, first and second multipliers each having an output and said first multiplier having first and second inputs;

means supplying a material weight signal to said first input of said first multiplier;

means supplying a material delivery speed signal to said second input of said first multiplier;

an amplifier connected to amplify the difference between the outputs of said first and second multipliers and to have an output connected to control the rate of material feed;

a volts-to-frequency converter connected to the output of said amplifier to supply an output frequency signal with the frequency dependent upon said amplifier voltage output; and feedback means connecting said output frequency signal to an input of said second multiplier to reduce the voltage applied to said amplifier.

17. A feed rate control circuit as set forth in claim 16, including a reference voltage source, the output of said first multiplier being proportional to said reference voltage and being connected to one of said supplying means.

18. A feed rate control circuit as set forth in claim 17, wherein said feedback means includes a feedback of said reference voltage to a second input of said second multiplier.

19. A feed rate control circuit as set forth in claim 16, including a clock signal, means to scale said clock signal, and said first multiplier having a third input connected to receive said scaled clock signal.

20. A feed rate control circuit as set forth in claim 19, wherein said feedback means includes a feedback of said clock signal to a third input of said second multiplier.

* * * * *